US009148581B2

(12) United States Patent
Chuang et al.

(10) Patent No.: US 9,148,581 B2
(45) Date of Patent: Sep. 29, 2015

(54) MULTI-FUNCTION CONTROL ILLUMINATION DEVICE

(71) Applicant: NATIONAL CHIAO TUNG UNIVERSITY, Hsinchu (TW)

(72) Inventors: Jen-Hui Chuang, Hsinchu (TW); Wen-Chih Teng, Hsinchu County (TW)

(73) Assignee: National Chiao Tung University, Hsinchu (TW)

(*) Notice: Subject to any disclaimer, the term of this patent is extended or adjusted under 35 U.S.C. 154(b) by 406 days.

(21) Appl. No.: 13/890,309

(22) Filed: May 9, 2013

(65) Prior Publication Data
US 2014/0198219 A1 Jul. 17, 2014

(30) Foreign Application Priority Data
Jan. 15, 2013 (TW) .............................. 102101452 A

(51) Int. Cl.
H04N 5/33 (2006.01)
H04N 5/235 (2006.01)

(52) U.S. Cl.
CPC .................................. H04N 5/2354 (2013.01)

(58) Field of Classification Search
CPC ............................. H04N 5/2354; H04N 5/235
USPC ............ 348/164, 159, 370, 207.11, 500, 521
IPC .............................................. H04N 5/33, 5/235
See application file for complete search history.

(56) References Cited

U.S. PATENT DOCUMENTS

| 7,593,593 | B2* | 9/2009 | Wilson | 382/275 |
| 7,812,971 | B2* | 10/2010 | Jackson et al. | 356/614 |
| 8,792,005 | B2* | 7/2014 | Huseth et al. | 348/159 |
| 2005/0109959 | A1* | 5/2005 | Wasserman et al. | 250/559.19 |
| 2012/0169673 | A1* | 7/2012 | Wilson | 345/175 |
| 2012/0212619 | A1* | 8/2012 | Nagamune | 348/164 |

OTHER PUBLICATIONS

Jonathan Dowdall, Ioannis Pavlidis, George Bebis; Face Detection in the Near-IR Spectrum; Image and Vision Computing 21, Elsevier, (2003), pp. 565-578.

(Continued)

Primary Examiner — Trang U Tran
(74) Attorney, Agent, or Firm — Rosenberg, Klein & Lee

(57) ABSTRACT

A multi-function control illumination device has a synchronization separator, a parameter setting device, a light emitting device, and a video processor. The synchronization separator connects with a video camera and the parameter setting device connecting with the light emitting device. The synchronization separator receives a video signal from the video camera, retrieves a synchronization signal from the video signal, and outputs the synchronization signal to the parameter setting device. The parameter setting device generates an electric signal corresponding to the synchronization signal according to at least one illumination parameter and outputs the electric signal to the light emitting device. The light emitting device emits toward a shooting direction of the video camera a light beam whose intensity periodically varies according to the electric signal. Thereby, the video camera captures images exposed by light beams of different intensities lest nearby persons be overexposed and distant persons be under-exposed.

18 Claims, 13 Drawing Sheets

(56) References Cited

OTHER PUBLICATIONS

Peggy Joy Lu, Jen-Hui Chuang, Horng-Horng Lin; Intelligent Nighttime Video Surveillance Using Multi-Intensity Infrared Illuminator; Proceedings of the World Congress on Engineering and Computer Science, 2011 vol. 1, WCECS 2011, Oct. 19-21, 2011, San Francisco, USA.

Yi-Ting Chen, Jen-Hui Chuang, Wen-Chin Teng, Horng-Horng Lin, Hua-Tsung Chen; Robust License Plate Detection in Nighttime Scenes Using Multiple Intensity IR-Illuminator; IEEE 2012, p. 893-898.

* cited by examiner (original sequence of images)

| 1 (the highest light intensity) | 2 (the second highest light intensity) | 3 (the second weakest light intensity) | 4 (the weakest light intensity) | ... | ... |

| | n (the highest light intensity) | n+1 (the second highest light intensity) | n+2 (the second weakest light intensity) | n+3 (the weakest light intensity) | ... |

Fig.2(a)

MULTI-FUNCTION CONTROL ILLUMINATION DEVICE

BACKGROUND OF THE INVENTION

1. Field of the Invention

The present invention relates to an illumination device, particularly to a multi-function control illumination device.

2. Description of the Related Art

As the video camera has functions of image capturing and real time monitoring, it has become an important tool for home security and crime prevention. With advance of science and technology, the video camera has been able to capture images in various environments, such as indoors, inside transport vehicles, at night or in a rainy day. Further, the video camera can also implement far-end monitoring and assist in administration nowadays.

Daylight illumination is sufficient to make a video camera take a clear image. However, the natural light source at nighttime is too dim to make a video camera take an image. The current solution of the problem is using an auxiliary infrared light source to assist in taking images at night. As the conventional infrared light source has a fixed intensity, the nearby persons are likely to overexpose, and the distant persons are likely to underexpose.

Accordingly, the present invention proposes a multi-function control illumination device, to overcome the abovementioned exposure problem and provide additional functions to enhance image quality.

SUMMARY OF THE INVENTION

The primary objective of the present invention is to provide a multi-function control illumination device, which cooperates with a video camera to undertake surveillance and video recording at night, and which uses various combinations of a frequency parameter, an intensity parameter, a step parameter, a pattern parameter, a wavelength parameter and a synchronization parameter to periodically emit light of pre-defined intensities to obtain images of different exposures without detecting the light intensity of the external environment. When the illumination device emits more intense light, the illumination is more suitable to undertake the surveillance and video recording of distant persons, preventing from underexposure of the distant persons. When the illumination device emits weaker light, the illumination is more suitable to undertake the surveillance and video recording of nearby persons, preventing from over-exposure of the nearby persons.

Another objective of the present invention is to provide a multi-function control illumination device, which can achieve an energy-saving effect via 3 techniques, (1) periodically vary the intensity of illumination (not always the maximum light intensity), (2) disable output during synchronization time and (3) PWM techniques.

Yet another objective of the present invention is to provide a multi-function control illumination device, which uses a synchronization separator to extract the exposure timing of Video camera. With the synchronized timing, a light illuminator can synchronize the output of image of camera with the output of light intensity of the illuminator, and wherein the synchronization speed is dependent on the video frame rate. For example, the illumination intensity varies per one-thirtieth seconds according to the NTSC (National Television System Committee) standard.

A further objective of the present invention is to provide a multi-function control illumination device, which alternately generates two wavebands of infrared light beams, such as an SWIR (Short-wave infrared) light beam and an NIR (Near Infrared) light beam that are respectively reflected by a human face at different reflectivity, to improve human face detection.

The last objective of the present invention is to provide a multi-function control illumination device, which use a video processor module to reorder/re-assign the sequence of images to respective multiple display channels according to the level of the intensity of light source, so as to improve the human viewing problem arisen from the varying-intensity of image brightness.

To achieve the abovementioned objectives, the present invention proposes a multi-function control illumination device, which comprises a synchronization separator, a parameter setting device, a light emitting device, and a video processor. The synchronization separator connects with a video camera and receives video information from the video camera. The synchronization separator acquires a synchronization signal from the video information and outputs the synchronization signal. The multi-function control illumination device varies the illumination intensity according to the timing of the synchronization signal to synchronize the variation of the illumination with the exposure variation of the video camera. The synchronization separator connects with a parameter setting device, which stores a plurality of illumination parameters, including frequency parameters, intensity parameters, step parameters, pattern parameters, wavelength parameters, and synchronization parameters. The parameter setting device receives the synchronization signal and generates a corresponding electric signal according to at least one illumination parameter. The parameter setting device connects with the light emitting device. The light emitting device receives the electric signal and projects a single-waveband light beam or a dual-waveband light beam (such as a light beam containing the SWIR beam and the NIR beam) to the shooting direction of the video camera, wherein the intensity of the light beam varies periodically. In order to solve the problem that human beings are unsuitable to watch images exposed by a sequence of different illumination intensities, the video processor connects with the video camera and the display device, reordering the images exposed by light beams of different illumination intensities and providing the reordered images to the display device.

Below, embodiments are described in detail in cooperation with drawings to make easily understood the technical contents, characteristics and accomplishments of the present invention.

BRIEF DESCRIPTION OF THE DRAWINGS

FIG. 2(*b*) schematically shows how to reorder frames which are coming from primitive sequence of frames (shown as FIG. 2(*a*).) illuminated by different light intensities, then display the reordered frames of different group to respective display devices (or display channels), wherein this procedure is illustrated by a case which step is 4, and in reality, it cab be any natural number;

DETAILED DESCRIPTION OF THE INVENTION

Below is introduced the principle of the present invention. The multi-function control illumination device of the present invention has 6 adjustable parameters, including parameters of frequency, intensity, step, pattern, wavelength and synchronization, able to periodically emit different pre-defined intensities of infrared light beams. The CCD or CMOS video camera, cooperating with the illumination device of the present invention, can obtain a sequence of images respectively which are illuminated by different light intensities. When the illumination device of the present invention emits more intense light, the illumination is more suitable to undertake the surveillance and video recording of distant persons, preventing from underexposure of the distant persons. When the illumination device of the present invention emits weaker light, the illumination is more suitable to undertake the surveillance and video recording of nearby persons, preventing from overexposure of the nearby persons. With the periodically and sequentially changed light intensities, the present invention can get as many as intensities to meet as many as objects in the scene. Therefore, the present invention can meet the requirement of exposure of multi-object, which is very different from the prior-art that is optimized for single object in the scene.

The multi-function control illumination device of the present invention can operate in a constant intensity mode or a periodically-varying intensity mode. Compared with the conventional technology, the technology of the present invention, which periodically varies the intensity of infrared LEDs, directly brings forth an advantage: the illumination provided by the present invention is more likely to expose both nearby persons and distant persons adequately. The present invention is an open-loop illumination device, operating independently without detecting the brightness of the external environment. Contrarily, the close-loop illumination device is a feedback-control system, which detects the brightness of the external environment and then adjusts the intensity of the light it emits according to the brightness of the external environment.

Figure 1:
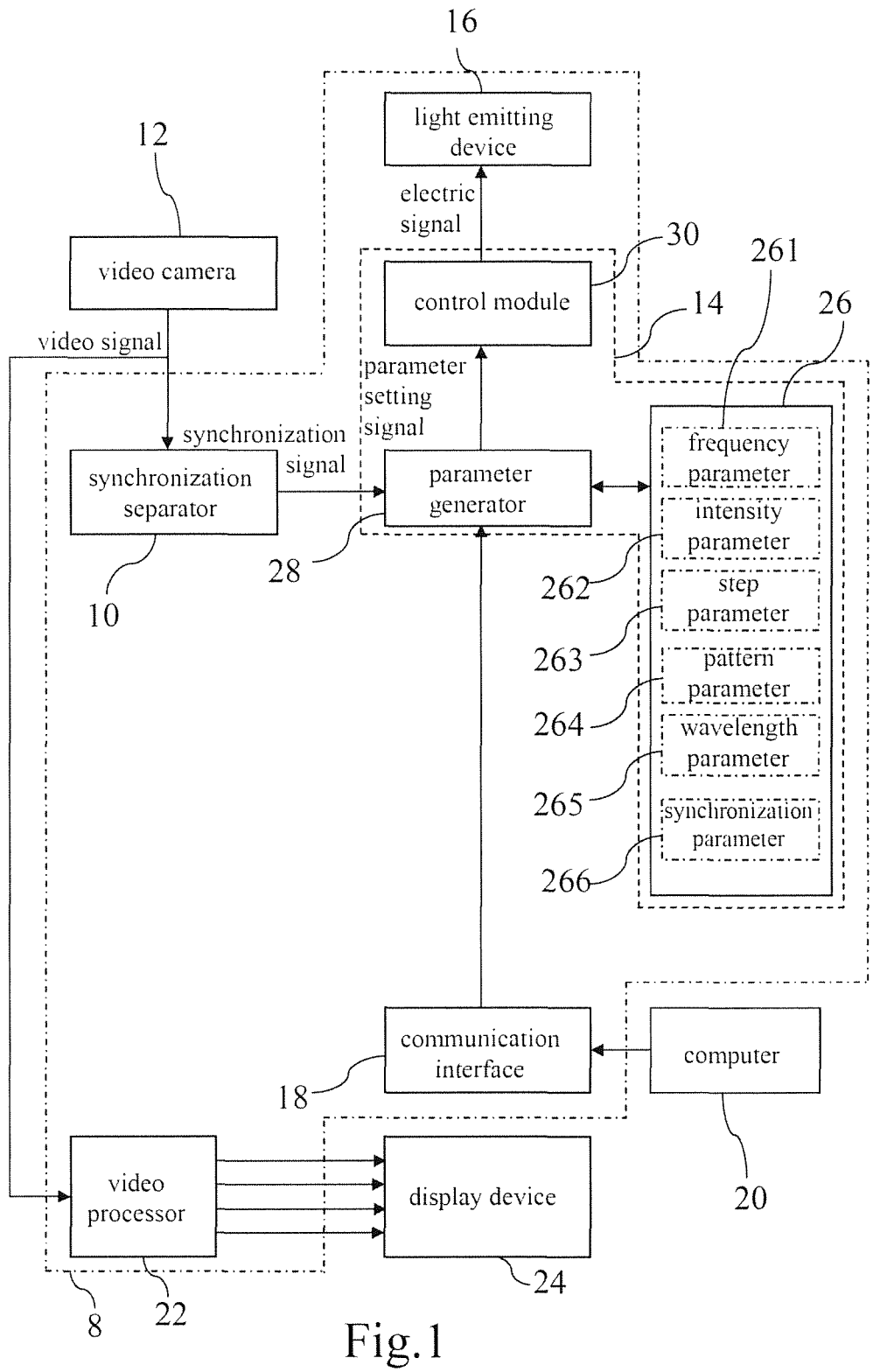
FIG. 1 is a block diagram schematically showing the circuit of a multi-function control illumination device according to one embodiment of the present invention.

Refer to FIG. 1 a block diagram schematically showing the circuit of a multi-function control illumination device according to one embodiment of the present invention. The multi-function control illumination device 8 of the present invention comprises a synchronization separator 10, a parameter setting device 14, a light emitting device 16, and a video processor 22. The synchronization separator 10 connects with a video camera 12. The synchronization separator 10 receives a video signal in the NTSC or PAL (Phase Alteration Line) format from the video camera 12, retrieves a synchronization signal from the video signal, and outputs the synchronization signal. The synchronization separator 10 also connects with the parameter setting device 14. The parameter setting device 14 stores a plurality of illumination parameters, including parameters of frequency, intensity, step, pattern, wavelength and synchronization. The parameter setting device 14 receives the synchronization signal and generates a corresponding electric signal, such as a current signal or a voltage signal, according to at least one illumination parameter. The parameter setting device 14 connects with the light emitting device 16, such as an infrared LED-based dual-band light emitting device, an NIR generator or an SWIR generator. The light emitting device 16 receives the electric signal and emits a light beam with a periodically-varying intensity toward a shooting direction of the video camera 12. Each period of the light beam has N steps of intensities, and N is a natural number.

The parameter setting device 14 connects with a computer 20 through a communication interface 18, and the computer 20 can set the illumination parameters of the parameter setting device 14 through the communication interface 18. In one embodiment, the communication interface 18 is LAN (Local Area Network) or UART (Universal Asynchronous Receiver/Transmitter).

Figure 2B:
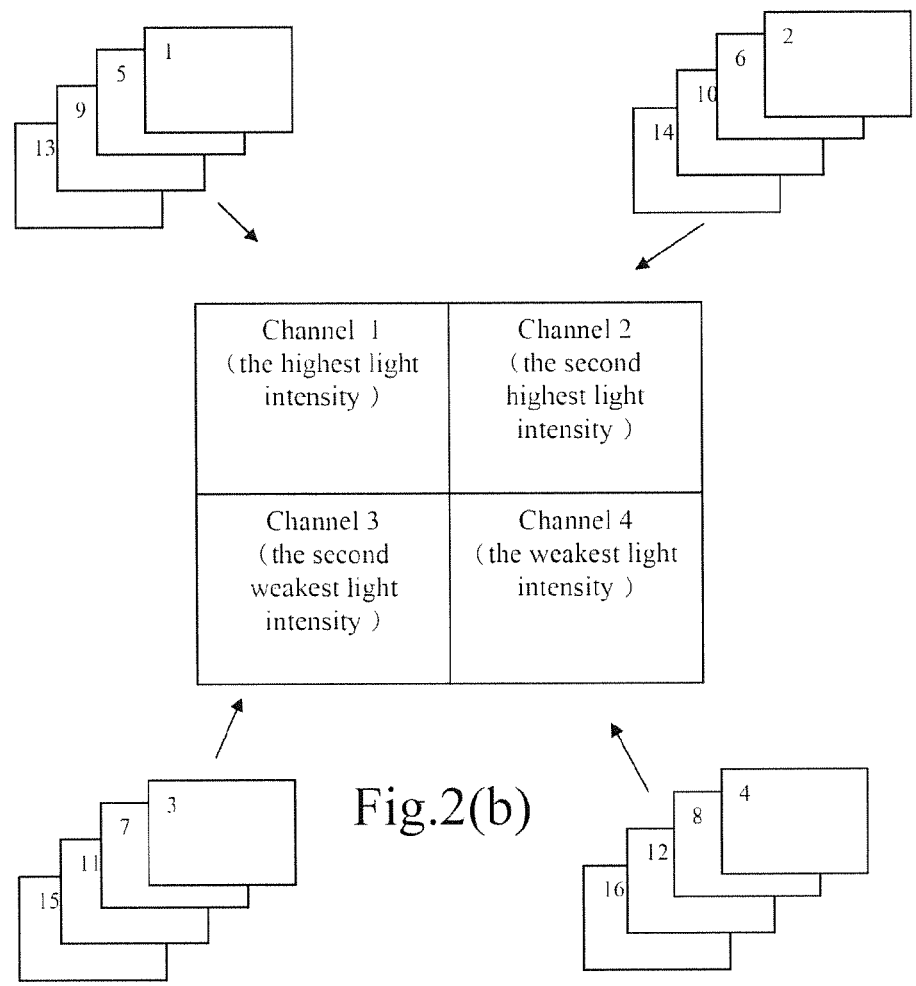
FIG. 2(*a*) schematically shows that the primitive sequence of frames illuminated by different light intensities is unsuitable for human viewing, wherein "steps" is arbitrarily set to 4 in this case, i.e every 4 frames are illuminated by 4 respective different light intensity periodically.

The video camera 12 connects with the video processor 22, and the video processor 22 further connects with at least one display device 24. The abovementioned video signal includes a sequence of frames respectively illuminated by different light intensities. The light emitting device 16 provides light beams respectively having different intensities for the video camera 12, whereby the video camera 12 can capture images. However, human beings are unsuitable to watch the image sequence exposed by the various light intensities of illumination. Therefore, the video processor 22 distributes/reorder the frames illuminated by the same step of light intensity to a new sequence of image group to corresponding display channel. The image frames illuminated by a different step of light intensity will be assigned/reordered to different sequence of image group, then to a different display channel. The video processor 22 reorders the frames of the video signal according to the illumination intensities and provides the reordered frames for the display device 24. Thus is solved the abovementioned problem. Refer to FIG. 2(b), wherein four frame groups respectively illuminated by four different light intensities are separately presented on four blocks on an identical screen or four frame groups respectively illuminated by four different light intensities are separately feed to four display devices. The four light intensities include the highest light intensity, the second highest light intensity, the second weakest light intensity, and the weakest light intensity. As shown in FIG. 1 and FIG. 2(a), the video camera 12 assigns the primitive sequence of frames illuminated by different light intensities to a single channel and transmits the primitive sequence of frames to the video processor 22. If the primitive sequence of frames is presented on a single screen, it would generate images suddenly dark, suddenly bright and unsuitable for human vision. The present invention overcomes the abovementioned problem via reordering the frames into different groups according to the light intensities thereof and outputting different groups of frames through different channels to present them on different blocks of a screen.

Figure 3:
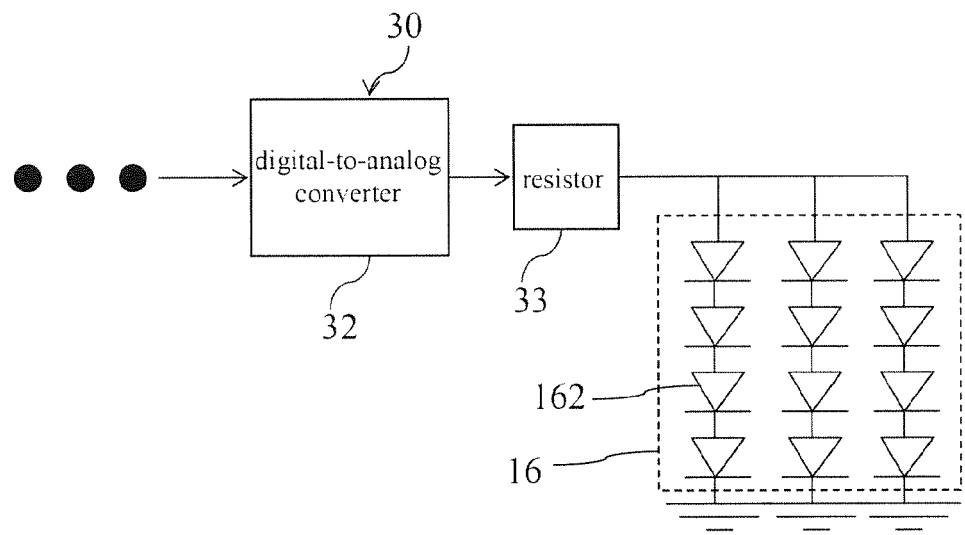
FIG. 3 schematically shows a digital-to-analog converter and the circuit of a light emitting device according to one embodiment of the present invention.
Figure 4:
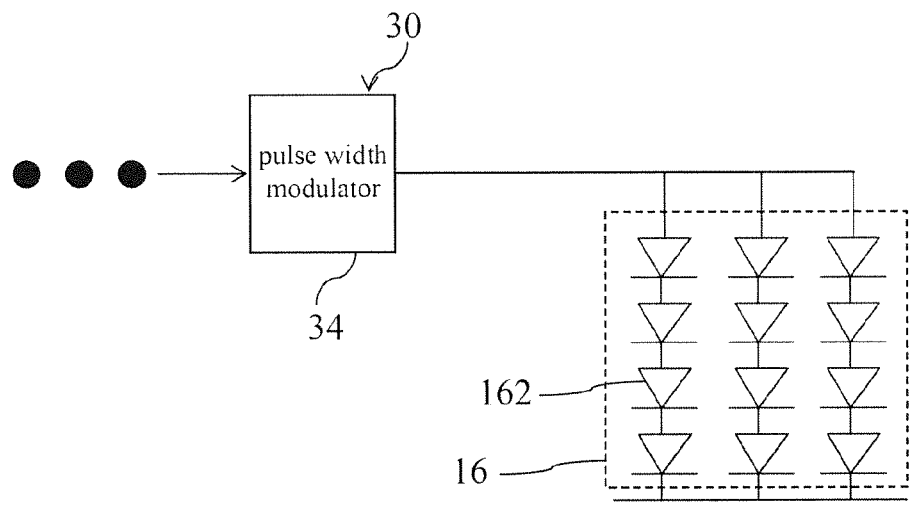
FIG. 4 schematically shows a pulse width modulator and the circuit of a light emitting device according to one embodiment of the present invention.
Figure 5:
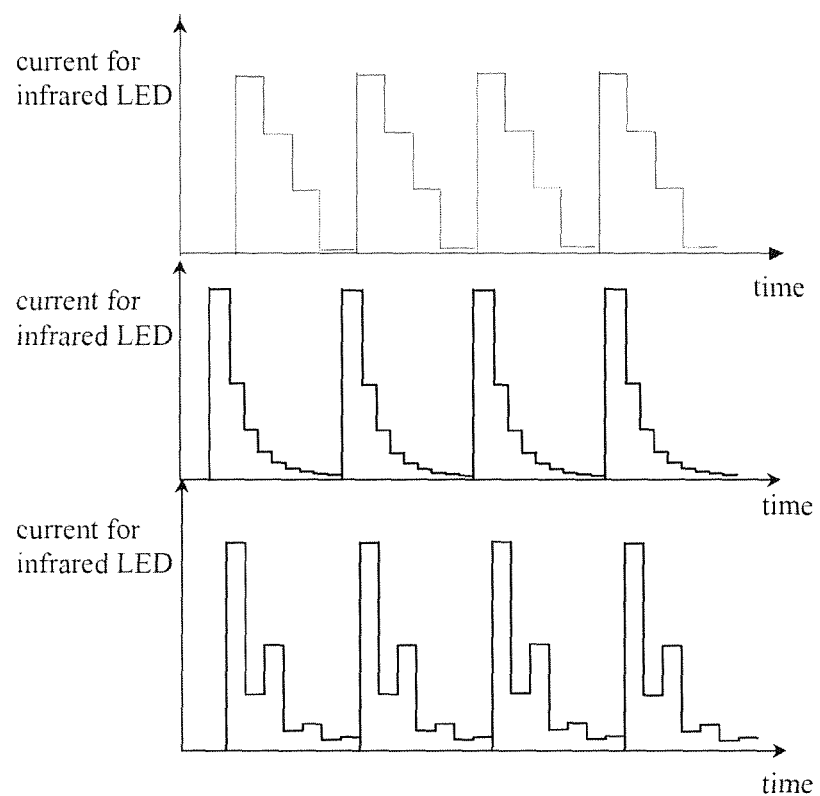
FIG. 5 shows waveforms of intensity of light signals according to one embodiment of the present invention.

The parameter setting device 14 includes a memory 26 (such as EEEPROM (Electrically-Erasable Programmable Read-Only Memory)) storing a frequency parameter 261, an intensity parameter 262, a step parameter 263, a pattern parameter 264, a wavelength parameter 265 and a synchronization parameter 266. The memory 26 connects with a parameter generator 28. The parameter generator 28 receives a synchronization signal and obtains at least one illumination parameter to generate a parameter setting signal. The parameter generator 28 connects with a control module 30, and the control module 30 connects with the light emitting device 16, whereby the parameter generator 28 connects with the light emitting device 16 through the control module 30. In one embodiment, the control module 30 is a digital-to-analog converter or a pulse width modulator. The control module 30 receives the parameter setting signal from the parameter generator 28 and generates an electric signal corresponding to the parameter setting signal. Refer to FIG. 3. If the control module 30 is a digital-to-analog converter 32, the digital-to-analog converter 32 connects with the light emitting device 16 containing a plurality of infrared LEDs 162 and generates an analog current signal to drive the infrared LEDs 162 through a resistor 33. Refer to FIG. 4. If the control module 30 is a pulse width modulator 34, the pulse width modulator 34 connects with the light emitting device 16 containing a plurality of infrared LEDs 162 and generates a PWM (Pulse Width Modulation)-based current signal to drive the infrared LEDs 162. In one embodiment, the abovementioned current signal has one of the waveforms shown in FIG. 5, whereby the infrared LEDs 162 generate infrared light beams whose intensities vary periodically.

Figure 6A:
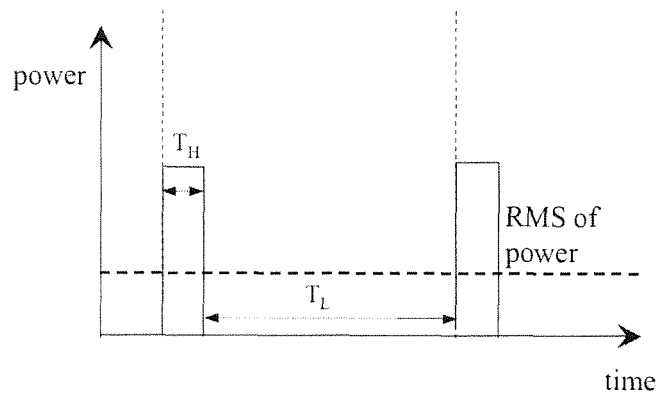
FIG. 6(a) and FIG. 6(b) show the waveforms of different PWM-based current signals according to one embodiment of the present invention.
Figure 6B:
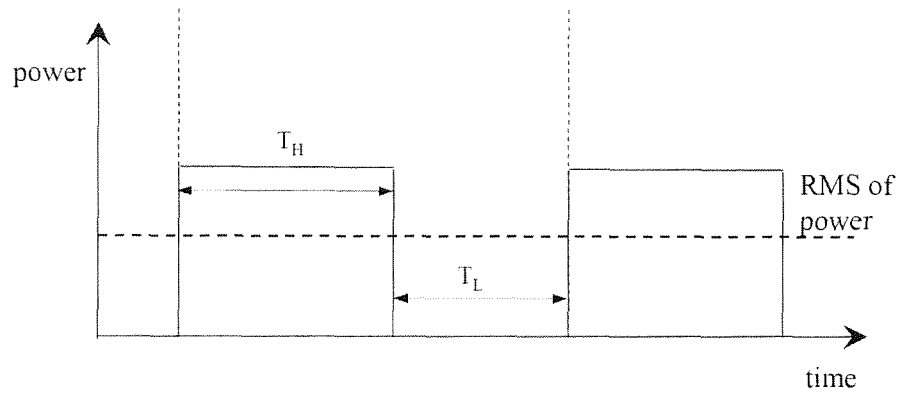

In one embodiment, the PWM-based current signal has the waveform shown in FIG. 6(a) or FIG. 6(b), wherein $T_H$ is the time interval of the high-level signal, $T_L$ the time interval of the low-level signal, and $T_H/(T_H+T_L)$ the duty cycle. From FIG. 6(a) and FIG. 6(b), it is observed that the waveform of FIG. 6(b) has a duty cycle larger than the waveform of FIG. 6(a). The larger the duty cycle, the higher the average power, and the brighter the light beams emitted by the infrared LEDs.

Below is introduced the operation of the present invention. Refer to FIG. 1 again. Firstly, the synchronization separator 10 receives a video signal from the video camera 12, retrieves a synchronization signal from the video signal, and outputs the synchronization signal to the parameter generator 28. Driven by the synchronization signal, the parameter generator 28 obtains at least one illumination parameter from the memory 26 and generates a parameter setting signal according to the illumination parameter. Next, the control module 30 receives the parameter setting signal from the parameter generator 28, generates an electric signal corresponding to the parameter setting signal, and outputs the electric signal to the light emitting device 16. According to the electric signal, the light emitting device 16 emits a light beam with a periodically-varying intensity toward a shooting direction of the video camera 12, whereby the video camera can capture images. After a period of time, the abovementioned video signal will contain a sequence of frames that were images of object illuminated by different light intensities periodically. The video processor 22 then further processes this kind of sequence of frames by re-distributing the frames to different display channel (or display device) for better viewing purpose. The video processor 22 can connect one or multiple display devices to display the reordered images of different group. The algorithm that video processor 22 adopts is that images exposed with the same level of light intensity will be reordered to the respective display channel (or display device). The display channel can be implemented by hardware or software approach.

If necessary, the user can operate the computer 20 to control the parameter generator 28 through the communication interface 18 to set the illumination parameters in the memory 26.

Below are introduced 6 parameters of the multi-function control illumination device of the present invention.

Figure 7A:
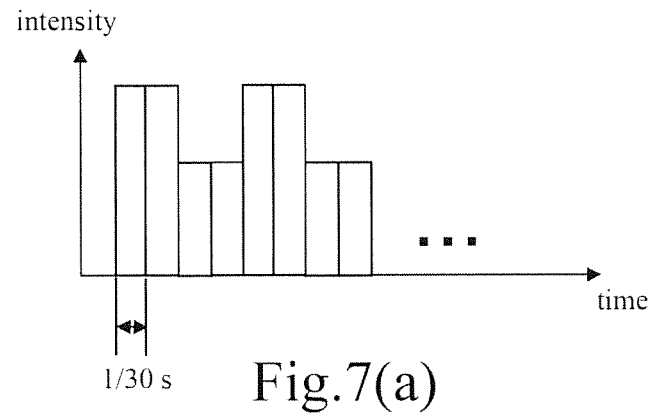
FIG. 7(a) and FIG. 7(b) show that the intensity variation waveforms respectively have different frequencies according to one embodiment of the present invention.
Figure 7B:
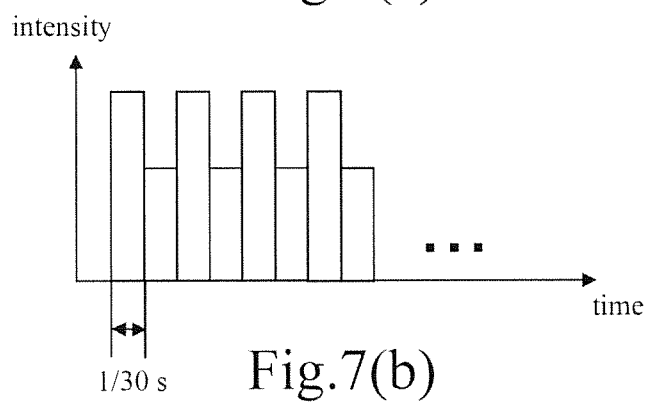

While the illumination parameter is the frequency parameter 261, the parameter generator 28 and control module 30 of the parameter setting device 14 adjusts the length of each period of the light intensity variation of the light beam according to the frequency parameter 261. The period of the light intensity variation of the light beam can be adjusted arbitrarily within a given range with a program to meet requirements of various nighttime monitoring tasks. For example, FIG. 7(a) and FIG. 7(b) show 2 different frequency settings, wherein FIG. 7(a)=15 Hz, and FIG. 7(b)=30 Hz.

Figure 8:
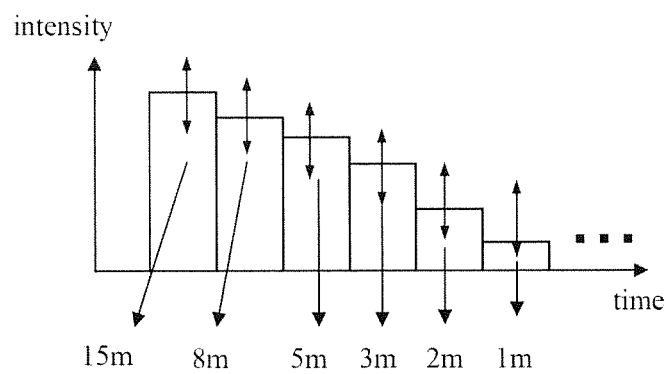
FIG. 8 shows an intensity variation waveform whose intensity on each step can be adjusted respectively according to one embodiment of the present invention.

While the illumination parameter is the intensity parameter 262, the parameter generator 28 and control module 30 of the parameter setting device 14 adjust the intensity of each step in a period independently according to the intensity parameter 262 to enhance the exposure quality of the nighttime images. If the intensities of the steps cannot be adjusted independently, it is hard to achieve that persons are all adequately exposed no matter where they are. In the present invention, the intensity of each step can be adjusted independently so that the light intensity in each step can adequately expose the different persons at the different locations. For example, there are 6 persons standing at distance 1 m, 2 m, 3 m, 5 m, 8 m and 15 m respectively from the CCD or CMOS video camera. Everybody is exposed by light beams of 6 appropriate intensities, as shown in FIG. 8. Thereby, the CCD or CMOS video camera has the chance to obtain a better image for all the 6 persons since everyone is exposed at 6 different intensities. At the best case, light intensity 1 is optimized for person 1, light intensity 2 is optimized for person 2, light intensity 3 is optimized for person 3, light intensity 4 is optimized for person 4, light intensity 5 is optimized for person 5, and light intensity 6 is optimized for person 6.

When all the steps are set to an identical intensity level (i.e the illumination intensity does not change periodically, similar to that of the conventional infrared illumination device.) Even under such scenario, the present invention still outperforms the conventional infrared illumination device because the present invention can set the intensity to an arbitrary value but the conventional infrared illumination device can only have a fixed intensity (typically, it is "maximum"). Additionally, with synchronization blank time, the present invention can save more power than the traditional illuminator by disable output during synchronization blank time.

If the pulse width modulator or digital-to-analog converter of the present invention has a resolution of N levels, wherein N is a natural number. then, there are as many as N light intensities can be set to each step selection in the present invention.

Figure 9A:
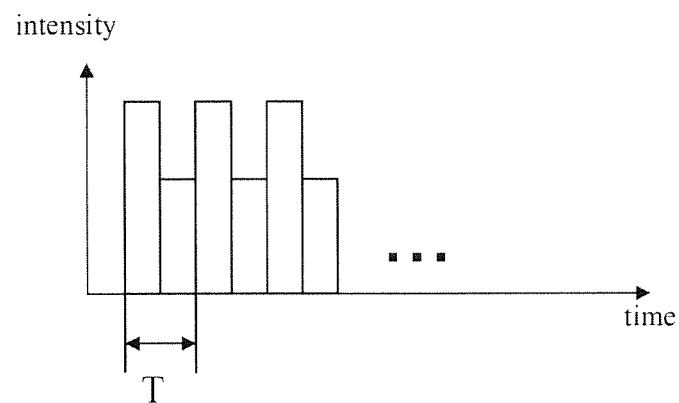
FIG. 9(a) and FIG. 9(b) show that the intensity variation waveforms respectively have different numbers of steps within a period according to one embodiment of the present invention.
Figure 9B:
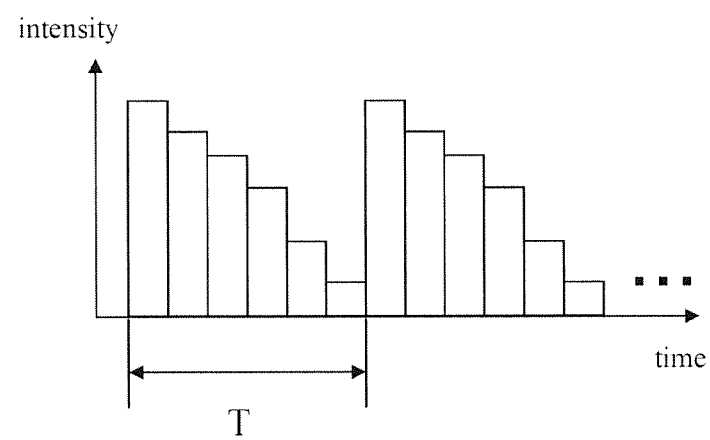

While the illumination parameter is the step parameter 263, the parameter generator 28 and control module 30 of the parameter setting device 14 adjust the number of the steps in a period according to the step parameter 263. For example, the variation is set to 2 steps in a period (as shown in FIG. 9(a)) or 6 steps in a period (as shown in FIG. 9(b)). The fewer the steps, the shorter the period, and the less the imaging information. Fewer steps favor fast scanning but impair enrichment of imaging information. The more the steps, the longer the period, and the more plentiful the imaging information. More steps favor enrichment of imaging information but impair fast scanning.

Figure 10A:
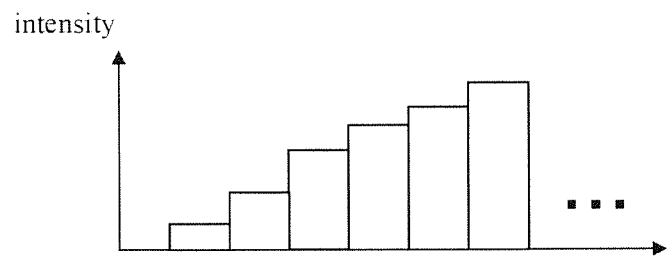
FIGS. 10(a)-10(g) show that the intensity variation waveforms respectively have different patterns according to one embodiment of the present invention.
Figure 10B:
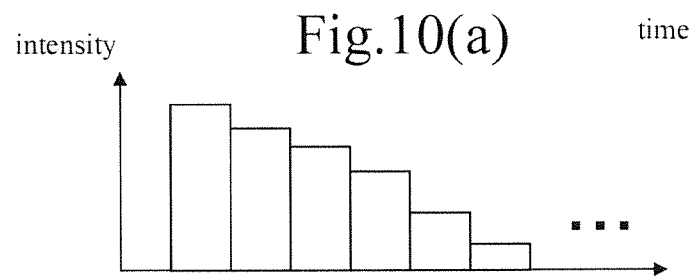
Figure 10C:
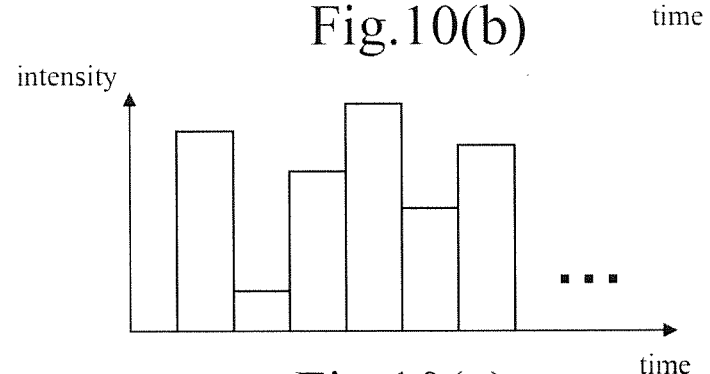
Figure 10D:
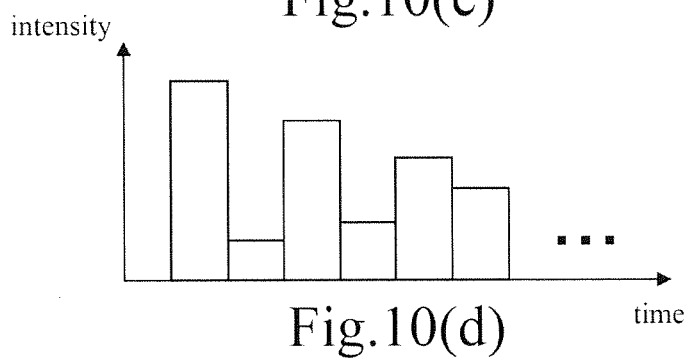
Figure 10E:
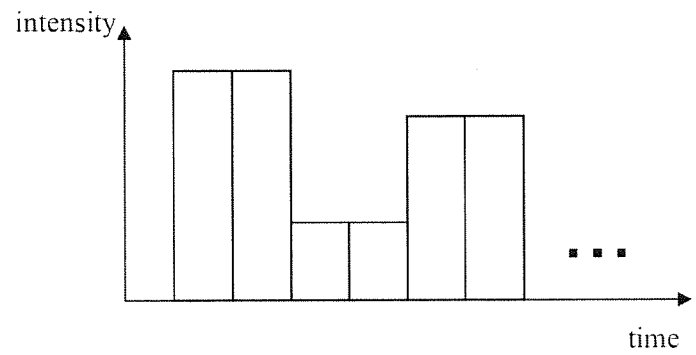
Figure 10F:
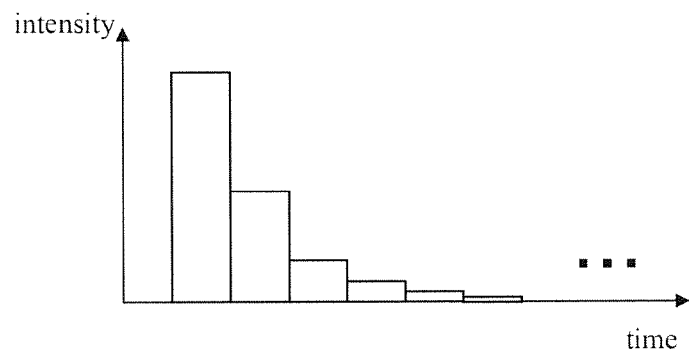
Figure 10G:
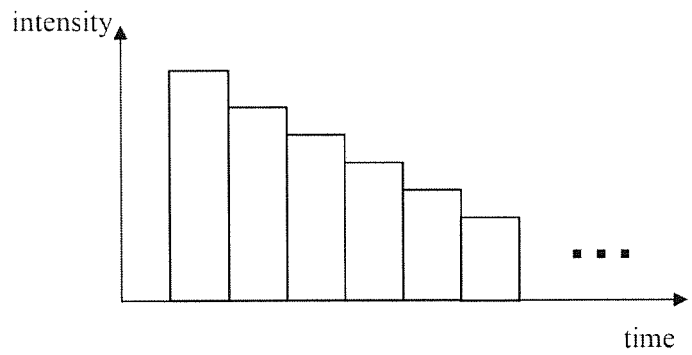

While the illumination parameter is the pattern parameter 264, the parameter generator 28 and control module 30 of the parameter setting device 14 can select a pattern from a database of pattern parameter 264 to meet its requirement for specific use case, such as a gradually-increasing pattern (shown in FIG. 10(a)), gradually-decreasing pattern (shown in FIG. 10(b)), a random pattern (shown in FIG. 10(c)), an adaptive-max-min pattern (shown in FIG. 10(d) and FIG. 10(e)), a geometrical-progression pattern (shown in FIG. 10(f)), or an arithmetic-progression pattern (shown in FIG. 10(g)). Each pattern can meets a specific use case scenario. The geometrical-progression pattern can use fewer steps to shift the illumination from bright to dark or from dark to bright than the arithmetic-progression pattern. Therefore, the geometrical-progression pattern has higher scanning efficiency than arithmetic-progression pattern. The arithmetic-progression pattern needs more steps to shift the illumination from bright to dark or from dark to bright than the geometrical-progression pattern. Therefore, the arithmetic-progression pattern has lower scanning efficiency. The adaptive-max-min pattern with "the highest, weakest, second highest, and second weakest light intensities strategy" may have further higher scanning efficiency in nighttime surveillance. The present invention can adopt different patterns to meet different use cases and situations. The memory 26 can stores a plurality of pattern parameter values (e.g. built in 64 patterns or 128 patterns . . . ) for various use case scenarios.

Figure 11:
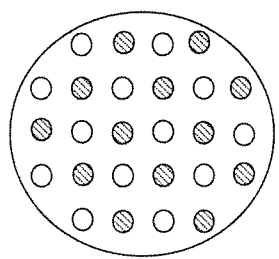
FIG. 11 schematically shows a dual-waveband infrared light source according to one embodiment of the present invention.

The parameter generator 28 and control module 30 of the parameter setting device 14 also determine whether to adopt a single-waveband infrared light beam or a dual-waveband infrared light beam according to the wavelength parameter 265. In one embodiment, the light emitting device 16 is realized by a dual-waveband infrared light source containing an NIR light beam having a wavelength of about 850 nm and an SWIR light beam having a wavelength of about 1450 nm. Refer to FIG. 11, wherein the hollow circlets represent LEDs emitting light beams having a wavelength of 850 nm, and the hatched circlets represent LEDs emitting light beams having a wavelength of 1450 nm. The reasons to use the dual-waveband infrared light source are that human skin has different reflectivity to the 850 nm and 1450 nm infrared light beams and that human faces or human skin can be detected more stably under the illumination of the dual-waveband infrared light source. The conventional infrared illumination device only uses a single waveband infrared light beam and thus is unlikely to have the advantage of a dual-waveband infrared light source: obtaining a higher detection rate of images of human faces. In brief, the present invention uses an NIR light beam having a wavelength of such as 800 nm or 950 nm and an SWIR light beam having a wavelength of such as 1450 nm. By using dual-waveband infrared light source, the preset invention can get a higher detection rate of nighttime human face detection.

Figure 12:
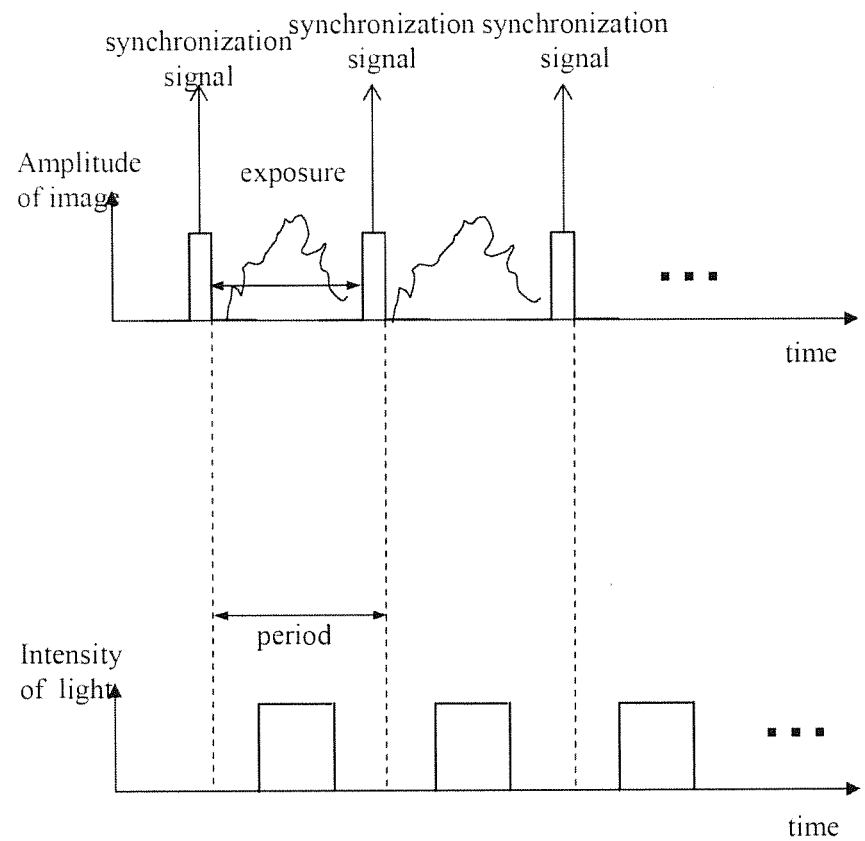
FIG. 12 shows the waveforms of image amplitude of a synchronization signal and a corresponding light intensity according to one embodiment of the present invention.

The parameter generator 28 and control module 30 of the parameter setting device 14 control the light emitting device 16 to emit light reference to the timing of the output of exposed image of the video camera 12, as shown in FIG. 12. The time interval between two adjacent pulses of the synchronization signal is closely related to the timing of the exposure of sensor of video camera 12. In the synchronous mode, the intensity of the output light varies synchronously (or with an offset) with some offset of the exposure timing of the video camera 12. The synchronous mode can solve the problem caused by asynchronization between the intensity variation of the light emitting device 16 and the exposure activity of the video camera 12 and thus makes easier the succeeding image processing, such as the separation of the foreground and the background or the image synthesis in HDR (High Dynamic Range) or visual monitoring purpose.

The present illumination device can be operated both in synchronization mode and asynchronous mode to meet different application scenarios, whereby the present invention can work more flexibly and powerfully. Typically, it will be used in synchronous mode since camera can generate a sequence of more formatted images under synchronous mode and achieve more power saving effect than asynchronous mode. (will be explained in more details later). When the synchronization parameter 266 are ser to "off", then the video camera will operates in an asynchronous mode, which means the timing of exposure in the CCD/CMOS sensor is independent to the timing of the variation of intensity of light source. In such a case, the intensity of the light emitted by the light emitting device 16 does not vary with the images synchronously. So the sequence of images got from asynchronous mode will be very hard to be post processed due to the fact that the brightness of a sequence of images will be unpredictable, and it's too complicated to process this kind of sequence of images. However, the asynchronous mode still has an advantage of lower price over synchronous mode due to the cost of synchronization separator hardware can be save in the asynchronous mode if our hardware are designed for low cost scenario.

The computer 20 selects a pattern parameter value from the memory 26 via the communication interface 18 to satisfy the case required. Alternatively, the computer 20 can select a pattern parameter value from the memory 26 without using the communication interface 18.

Figure 13A:
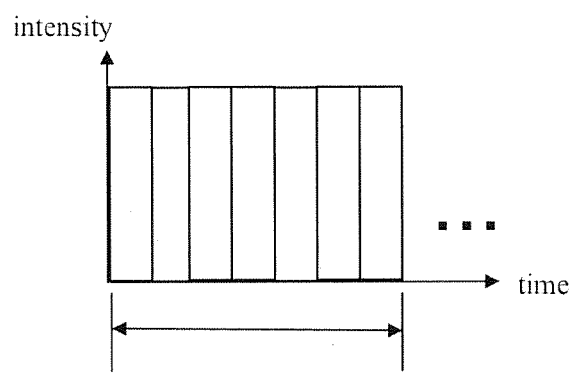
FIG. 13(a) shows the waveform of a light source having a constant intensity according to one embodiment of the present invention.
Figure 13B:
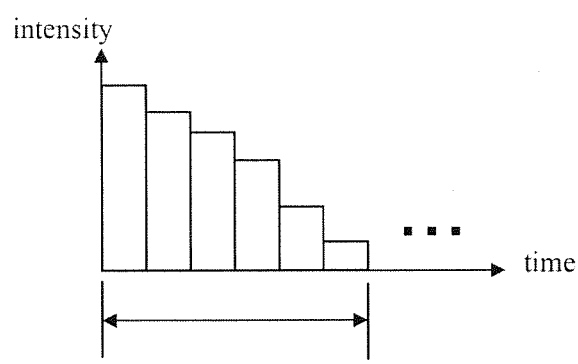
FIG. 13(b) shows the waveform of an intensity-varying light source according to one embodiment of the present invention.

Refer to FIG. 13(a). The illumination device of the present invention can operate in a fixed intensity and consumes more power. Refer to FIG. 13(b). Contrarily, the illumination device of the present invention varies the intensity periodically and consumes less power. Therefore, the present invention has a power-saving effect. The actual ratio of the saved power is dependent on the mode of intensity variation.

Figure 14:
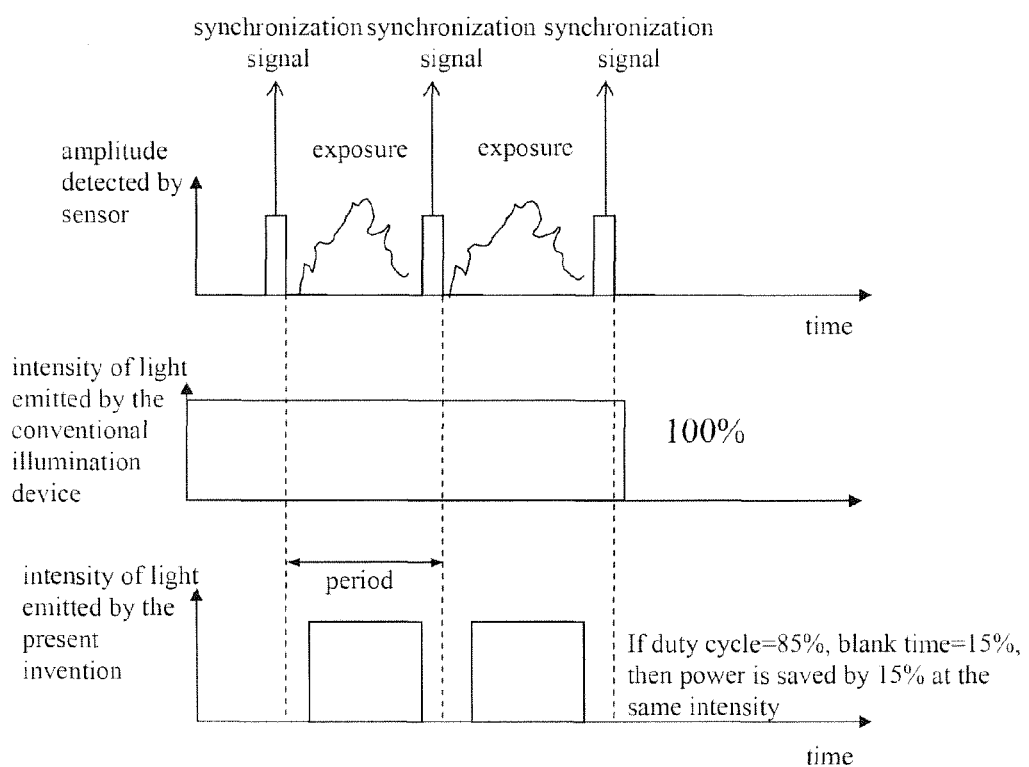
FIG. 14 schematically shows how to achieve the power-saving effect by the blank time of a synchronization signal according to one embodiment of the present invention.

The reason is that the present invention enables the lighting of the infrared light sources to synchronize with the synchronization signal of the synchronization separator 10. Therefore, the illumination device of the present invention does not emit light during the blank time. If the blank time is 15% of the period, 15% of power will be saved, as shown in FIG. 14. The present invention has a very obvious power-saving effect because of the following features: (1) the present invention adopts a PWM control technology; (2) the illumination device does not emit light during the blank time of the synchronization signal; (3) the intensity is not fixed but varies periodically.

In conclusion, the present invention outputs light beams with periodically-varying intensity to cooperate with the exposure of the video camera by a sync separator design of the present invention. The present invention thus simplifies the separation of the foreground and the background and the HDR image synthesis by synchronizing the timing of the varying-intensity of light source and the exposure of video camera.

The embodiments described above are only to exemplify the present invention but not to limit the scope of the present invention. Any equivalent modification or variation according to the characteristic or spirit of the present invention is to be also included within the scope of the present invention. For example, the present invention does not constrain that the light source must be an infrared one although infrared light sources are used to exemplify the light sources in the above-mentioned specification.

What is claimed is:

1. A multi-function control illumination device comprising:
    a synchronization separator connecting with a video camera, receiving a video signal from said video camera, and retrieving a synchronization signal from said video signal;
    a parameter setting device connecting with said synchronization separator, storing a plurality of illumination parameters, receiving said synchronization signal, and generating an electric signal corresponding to said synchronization signal according to at least one said illumination parameter;
    a light emitting device connecting with said parameter setting device, receiving said electric signal, and emitting a light beam with periodically-varying intensity to a shooting direction of said video camera according to said electric signal; and
    a video processor connecting with said video camera and at least one display device, reordering said video signal, which contains a sequence of frames respectively illuminated by different light intensity within a period, and providing said frames reordered for said display device by reordering said frames which are illuminated by same level of light intensity to same display sequence, and said frames with different illuminated light intensity are reordered to the different display sequence.

2. The multi-function control illumination device according to claim 1, wherein said light beam has N steps of intensities within one said period, and wherein N is a natural number.

3. The multi-function control illumination device according to claim 2, wherein said illumination parameters include a frequency parameter, an intensity parameter, a step parameter, a pattern parameter, a wavelength parameter, and a synchronization parameter.

4. The multi-function control illumination device according to claim 3, wherein said parameter setting device adjusts a length of said period according to said frequency parameter.

5. The multi-function control illumination device according to claim 3, wherein said parameter setting device adjusts intensity of each said step independently according to said intensity parameter.

6. The multi-function control illumination device according to claim 3, wherein said parameter setting device adjusts a count of said steps said intensities within one said period according to said step parameter.

7. The multi-function control illumination device according to claim 3, wherein said parameter setting device determines a pattern of intensity variation within one said period according to said pattern parameter, and wherein said pattern of said intensity variation comprises a gradually-decreasing pattern, a gradually-increasing pattern, a random pattern, an adaptive max.-min. pattern, and so on.

8. The multi-function control illumination device according to claim 3, wherein said parameter setting device determines that said light beam is a single-waveband light beam or a dual-waveband light beam according to said wavelength parameter.

9. The multi-function control illumination device according to claim 3, wherein said parameter setting device controls said light emitting device to emit said light beam during exposure intervals of said video camera according to said synchronization parameter.

10. The multi-function control illumination device according to claim 1, wherein said electric signal is a voltage signal or a current signal.

11. The multi-function control illumination device according to claim 1, wherein said video signal is in an NTSC (National Television System Committee) format or a PAL (Phase Alteration Line) format.

12. The multi-function control illumination device according to claim wherein said light emitting device is a dual-waveband light emitting device.

13. The multi-function control illumination device according to claim 1, wherein said light emitting device is an NIR (Near Infrared) light beam generator or an SWIR (Short-wave infrared) light beam generator.

14. The multi-function control illumination device according to claim 1, wherein said parameter setting device further comprises
    a memory storing said illumination parameters;
    a parameter generator connecting with said memory, receiving said synchronization signal, and obtaining at least one illumination parameter from said memory to generate a parameter setting signal; and
    a control module connecting with said parameter generator and said light emitting device, receiving said parameter setting signal from said parameter generator, and generating an electric signal corresponding to said parameter setting signal.

15. The multi-function control illumination device according to claim 14, wherein said memory is EEPROM (Electrically-Erasable Programmable Read-Only Memory).

16. The multi-function control illumination device according to claim 14, wherein said control module is a digital-to-analog converter or a pulse width modulator.

17. The multi-function control illumination device according to claim 14, further comprises a communication interface connecting with said parameter generator and a computer, wherein said computer controls said parameter generator through said communication interface to set said illumination parameters in said memory.

18. The multi-function control illumination device according to claim 17, wherein said communication interface is LAN (Local Area Network) or UART (Universal Asynchronous Receiver/Transmitter).

* * * * *